(12) United States Patent
Kasai et al.

(10) Patent No.: US 10,697,887 B2
(45) Date of Patent: Jun. 30, 2020

(54) OPTICAL CHARACTERISTIC MEASURING APPARATUS

(71) Applicant: CANON KABUSHIKI KAISHA, Tokyo (JP)

(72) Inventors: Yusuke Kasai, Saitama (JP); Hiroshi Kawanago, Utsunomiya (JP); Takashi Seki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 6 days.

(21) Appl. No.: 15/209,072

(22) Filed: Jul. 13, 2016

(65) Prior Publication Data

US 2017/0024895 A1 Jan. 26, 2017

(30) Foreign Application Priority Data

Jul. 22, 2015 (JP) .................................. 2015-145249

(51) Int. Cl.
| | |
|---|---|
| *G01N 21/27* | (2006.01) |
| *G01N 21/57* | (2006.01) |
| *G01N 21/84* | (2006.01) |
| *G01N 21/47* | (2006.01) |
| *G01N 21/55* | (2014.01) |

(52) U.S. Cl.
CPC ......... *G01N 21/278* (2013.01); *G01N 21/274* (2013.01); *G01N 21/276* (2013.01); *G01N 21/57* (2013.01); *G01N 2021/4757* (2013.01); *G01N 2021/556* (2013.01); *G01N 2021/557* (2013.01);
(Continued)

(58) Field of Classification Search
None
See application file for complete search history.

(56) References Cited

U.S. PATENT DOCUMENTS

| | | | |
|---|---|---|---|
| 4,886,355 A | 12/1989 | Keane | |
| 7,391,518 B1 | 6/2008 | Schwarz et al. | |

(Continued)

FOREIGN PATENT DOCUMENTS

| | | |
|---|---|---|
| JP | 2001041888 A | 2/2001 |
| JP | 2007225384 A | 9/2007 |

(Continued)

OTHER PUBLICATIONS

Domestic Standard JIS-Z8741 Chapter 4 "Measurement Condition".

(Continued)

*Primary Examiner* — Matthew C Bella
*Assistant Examiner* — Brian Shin
(74) *Attorney, Agent, or Firm* — Rossi, Kimms & McDowell LLP

(57) ABSTRACT

A measuring apparatus that measures an optical characteristic of a surface in accordance with a standard selected from a plurality of standards is provided. The apparatus includes an illumination device configured to illuminate the surface with light from a light source, an imaging device configured to image the light source with reflected light from the surface illuminated by the illumination device, and a processor configured to process image data having number of pixels obtained by reducing number of pixels of the imaging device by a reduction rate to obtain the optical characteristic of the surface. The processor is configured to determine the reduction rate based on the selected standard.

12 Claims, 7 Drawing Sheets

(52) U.S. Cl.
CPC .......... *G01N 2021/575* (2013.01); *G01N 2021/8427* (2013.01); *G01N 2201/0221* (2013.01)

(56) References Cited

U.S. PATENT DOCUMENTS

| | | | |
|---|---|---|---|
| 7,436,516 | B2 | 10/2008 | Okui et al. |
| 2003/0151746 | A1 | 8/2003 | Sperling et al. |
| 2007/0195327 | A1* | 8/2007 | Okui .............. G01N 21/57 |
| | | | 356/445 |
| 2007/0201029 | A1 | 8/2007 | Jinno |
| 2007/0237385 | A1 | 10/2007 | Kato |
| 2007/0273886 | A1 | 11/2007 | Matsumoto et al. |
| 2009/0116023 | A1 | 5/2009 | Wadman |
| 2011/0242556 | A1 | 10/2011 | Jinno et al. |

FOREIGN PATENT DOCUMENTS

| | | |
|---|---|---|
| JP | 2010030522 A | 2/2010 |
| JP | 4705277 B2 | 6/2011 |
| JP | 2012013444 A | 1/2012 |

OTHER PUBLICATIONS

Extended European Search Report issued in European Patent Application No. 16177084.7 dated Dec. 7, 2016.
Office Action issued in Japanese Appln. No. 2015-145249 dated Sep. 9, 2019.
Office Action issued in Japanese Appln. No. 2015-145249 dated Mar. 29, 2019.

* cited by examiner

OPTICAL CHARACTERISTIC MEASURING APPARATUS

BACKGROUND OF THE INVENTION

Field of the Invention

The present invention relates to a technique of measuring an optical characteristic of a surface.

Description of the Related Art

The optical characteristic of the surface of an object such as a printed product, a coating, or a plastic material is an important factor associated with quality. As methods of measuring the optical characteristic of an object surface, there exist methods of measuring, for example, a specular gloss, a DOI (Distinct Of Image), Haze, and the like. In a conventional optical characteristic measuring apparatus, incident light is focused to a predetermined angle of aperture, a surface is irradiated at a predetermined angle of incidence, and reflected light from the surface is focused to a predetermined angle of aperture and received by a light receiving element such as a PD (photodiode) or a line sensor, thereby performing measurement. Japanese Patent Laid-Open No. 2007-225384 discloses a method that removes a stop on the light receiving side and uses a two-dimensional area sensor as a light receiving element, thereby enabling measurement even in a case in which the surface tilts, and the light receiving range moves.

In the technique of Japanese Patent Laid-Open No. 2007-225384, it is necessary to use an area sensor having a wide region enough to cover the irradiation region of reflected light. Since the recent mainstream is a megapixel sensor that includes at least several million pixels and attains a high resolution, an enormous amount of data is needed to acquire reflected light in a wide region. For this reason, the amount of calculation necessary for measurement processing increases, and data transfer takes time. A CPU capable of high-speed processing and a mass memory are needed, resulting in an increase in cost. In Japanese Patent Laid-Open No. 2007-225384, mention is made of only measurement at a single angle. If the apparatus is configured to measure at a plurality of angles, the problem becomes more conspicuous.

SUMMARY OF THE INVENTION

The present invention provides, for example, a measuring apparatus advantageous in reduction of an amount of data to be processed to obtain an optical characteristic of a surface.

According to one aspect of the present invention, there is provided a measuring apparatus that measures an optical characteristic of a surface in accordance with a standard selected from a plurality of standards, the apparatus comprises an illumination device configured to illuminate the surface with light from a light source, an imaging device configured to image the light source with reflected light from the surface illuminated by the illumination device, and a processor configured to process image data having number of pixels obtained by reducing number of pixels of the imaging device by a reduction rate to obtain the optical characteristic of the surface, wherein the processor is configured to determine the reduction rate based on the selected standard.

Further features of the present invention will become apparent from the following description of exemplary embodiments (with reference to the attached drawings).

DESCRIPTION OF THE EMBODIMENTS

Various exemplary embodiments, features, and aspects of the invention will be described in detail below with reference to the drawings.

Hereinafter, an embodiment of the present invention will be described in detail with reference to the accompanying drawings. It should be noted that the present invention is not limited to the following embodiment, and a detailed example advantageous in implementing the present invention will merely be described. In addition, not all the combinations of features described in the embodiment are necessarily essential to solve the problem of the present invention.

First Embodiment

Figure 1:
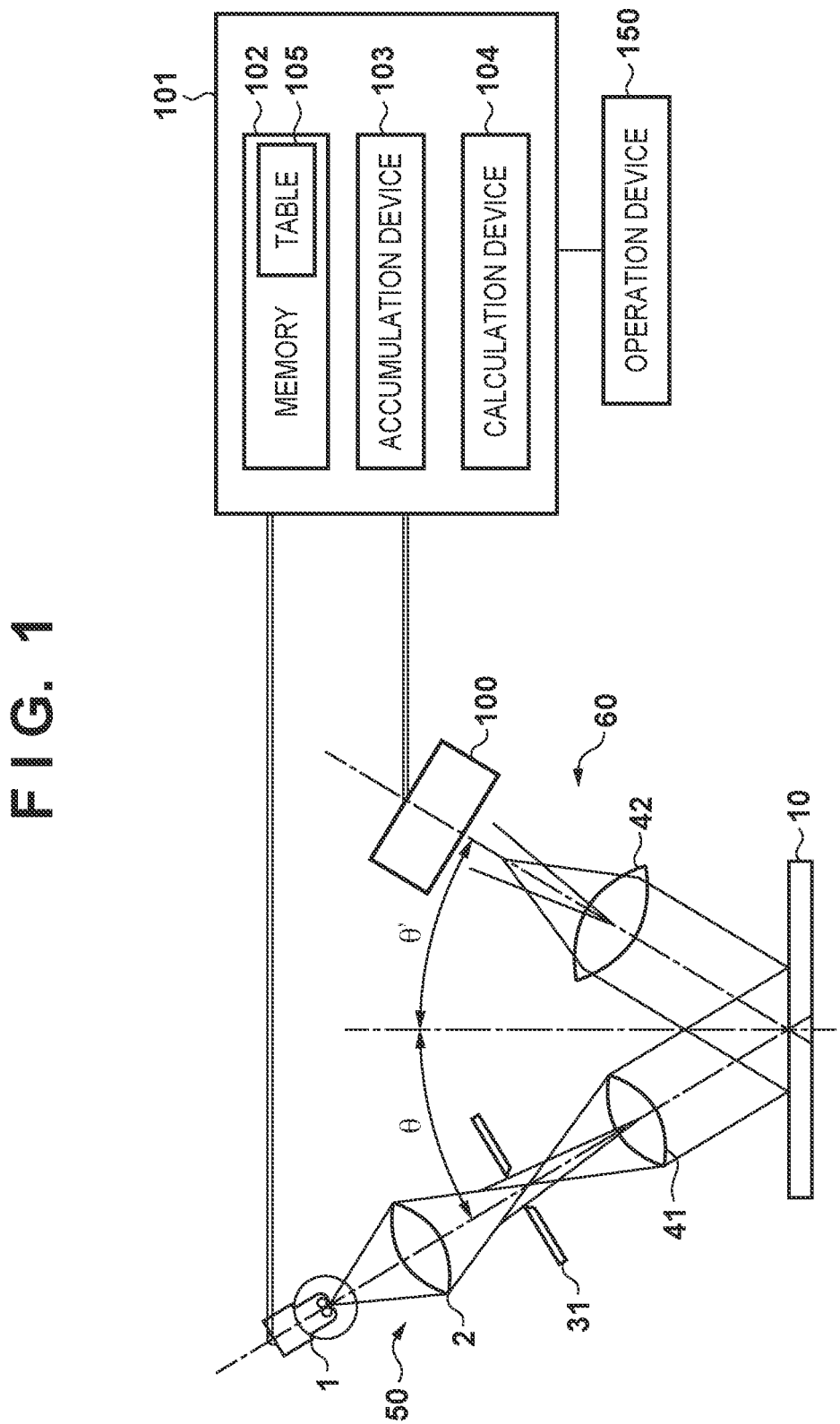
FIG. 1 is a view showing the arrangement of an optical characteristic measuring apparatus according to an embodiment.

FIG. 1 is a view showing the arrangement of an optical characteristic measuring apparatus according to this embodiment. In this embodiment, the dimensions, arrangements, and layouts of a lens, a deflecting member, a light receiving device, and the like are set to meet minimum basic conditions presented by an international or domestic standard. For example, according to domestic standard JIS-Z8741 Chapter 4 "Measurement Condition", for example, concerning measurement of a specular gloss that is one of optical characteristics, an angle of aperture of a light source image (light projecting system aperture angle), an angle of aperture of a light receiving device (light receiving system aperture angle), an angle of incidence, an angle of receiving, and the like are defined. The measuring apparatus according to this embodiment complies with the standard.

The optical characteristic measuring apparatus according to this embodiment includes an illumination device 50 that is a light projecting system, an imaging device 60 that is a light receiving system, a control device 101, and an operation device 150. The illumination device 50 includes a light source 1, a lens 2, a light source slit 31, and a lens 41, and illuminates a surface 10 with light from the light source 1. The imaging device 60 captures an image by reflected light from the surface 10 based on the illumination light from the illumination device 50. The imaging device 60 includes a lens 42 and a light receiving device 100. The control device 101 controls the operations of the illumination device 50 and the imaging device 60. The control device 101 also functions as a processor that performs calculation processing of the optical characteristic of the surface 10, and includes a memory 102, an accumulation device 103, and a calculation device 104. The operation device 150 receives a setting instruction concerning measurement from a user.

In the illumination device 50, a light beam from the light source 1 is condensed, by the lens 2, onto the light source slit 31 set to an angle of aperture defined by the standard. A secondary light source with the defined angle of aperture is thus formed by the light source slit 31. The light beam from the light source slit 31 is changed to an almost parallel beam by the lens 41 and irradiates the surface 10. Reflected light from the surface 10 forms a reflection pattern unique to the surface according to the state of the surface 10. The light is then converted into a focused beam by the lens 42 of the imaging device 60 and is incident on the light receiving device 100.

Figure 2:
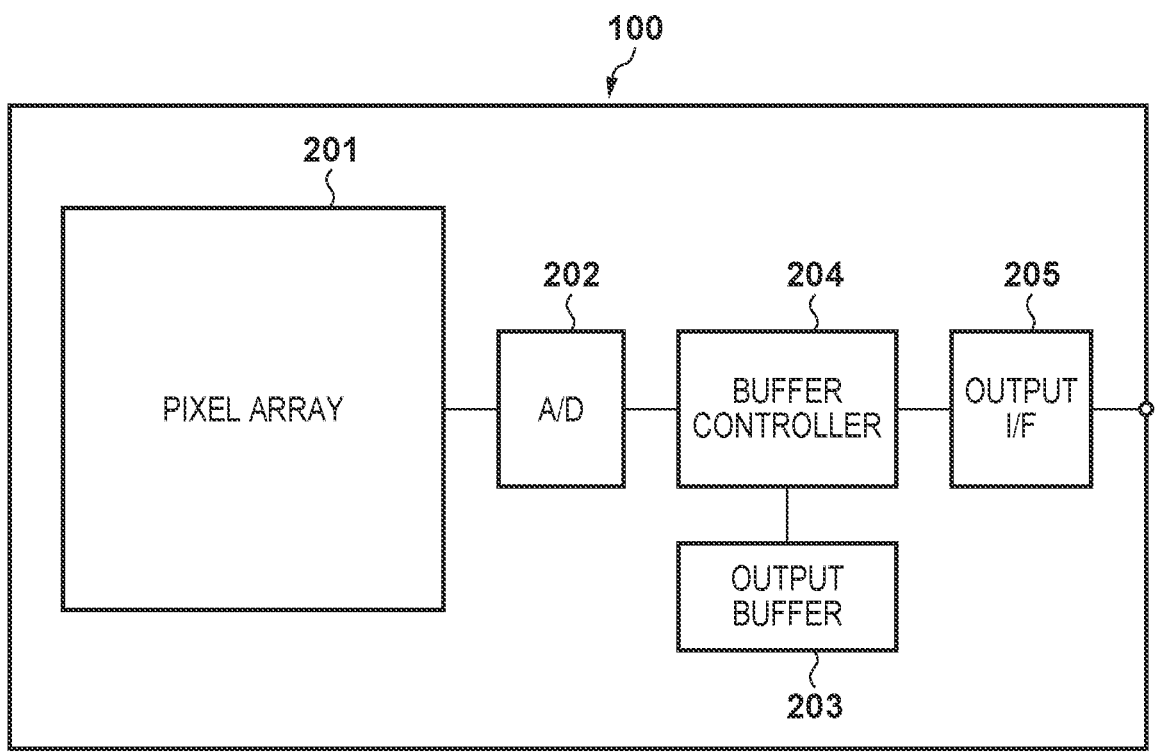
FIG. 2 is a block diagram showing an example of the arrangement of a light receiving device according to the embodiment.

FIG. 2 shows an example of the arrangement of the light receiving device 100. The light receiving device 100 can be formed from an area sensor (imaging element) such as a CCD image sensor or a CMOS image sensor. Referring to FIG. 2, a pixel array 201 is a pixel group forming a light receiving surface in which a plurality of pixels each including a photoelectric conversion element are arrayed in a matrix on a substrate. An A/D conversion device 202 converts an analog image signal read out from the pixel array 201 into a digital image signal. An output buffer 203 temporarily saves first image data of one frame as raw data. A buffer controller 204 controls write of image data from the A/D conversion device to the output buffer 203 and readout of the first image data from the output buffer 203. The buffer controller 204 outputs the first image data read out from the output buffer 203 via an output interface 205 (output I/F).

Referring back to FIG. 1, an angle $\theta$ of incidence and an angle $\theta'$ of receiving can take at least one angle out of 20°, 45°, 60°, 75°, and 85°, complying with, for example, JIS-Z8741. Here, the angle $\theta$ of incidence is the angle of incidence of light with which the illumination device illuminates the surface. The angle $\theta'$ of receiving is the angle of receiving of reflected light received by the imaging device. The light receiving surface of the light receiving device 100 is formed to be larger than a region as an optical characteristic calculation target where a light beam of a light receiving system aperture angle is received. This will be described with reference to FIGS. 3A to 3D. Let A2 be the region of the light receiving surface (the size of the light receiving surface) of the light receiving device 100. A region (a region used of calculation) as an optical characteristic calculation target where a light beam of a light receiving system aperture angle is received is A1. Region A2>region A1 holds. A region A3 is a region of a light projecting system aperture angle. If the surface 10 is a specular reflecting surface (mirror surface), the size of light received on the region A2 almost equals the size of the region A3. As the diffused component of the light reflected by the surface 10 becomes large, the size of the light received on the region A2 increases. Although the actual position and size of the region A1 change depending on the arrangement of the optical characteristic measuring apparatus because they are defined by angles in the standard, the region A1 is configured to be located at the center of the region A2. However, if the surface 10 tilts, reflected light also tilts, and the light receiving position varies. To enable following in this case, the position of the region A1 on the region A2 may be redefined as needed by calculating it from the peak position or the position of center of gravity of the reflected light.

Figure 3A:
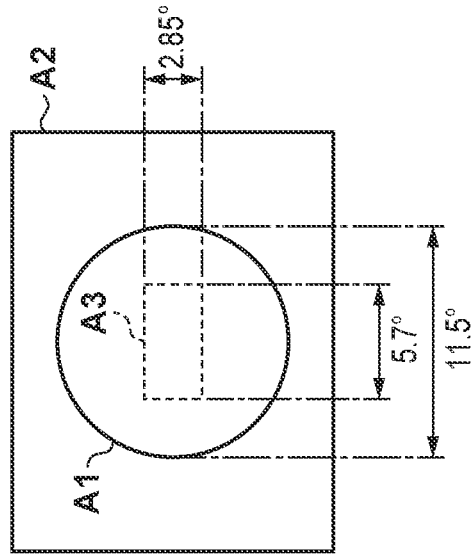
FIGS. 3A to 3D are views showing examples of the relationship between a region A2 of a light receiving surface, a region A1 of a light receiving system aperture angle, and a region A3 of a light projecting system aperture angle based on internal and domestic standards.
Figure 3C:
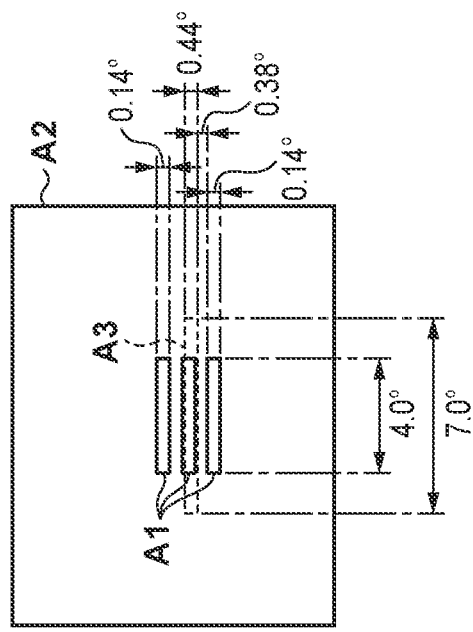
Figure 3B:
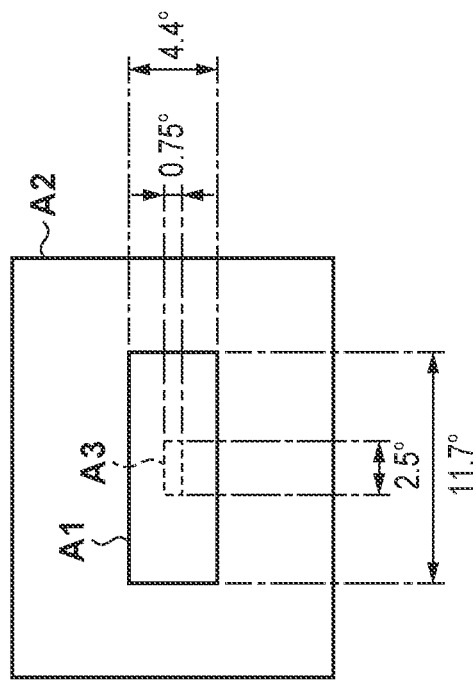
Figure 3D:
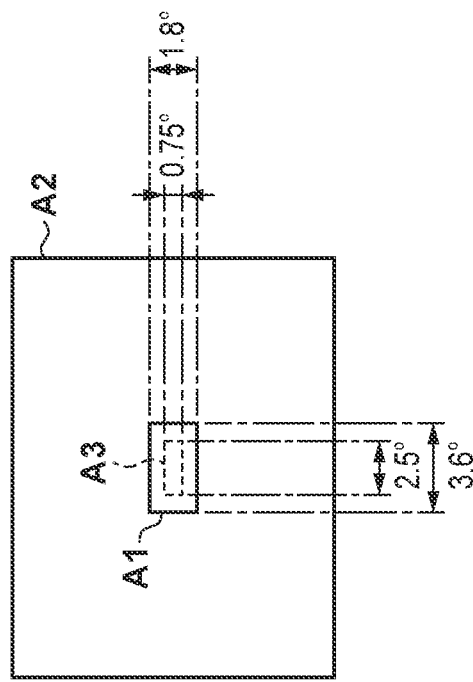

FIGS. 3A to 3D show the regions A1 and A3 obtained by different standards. The size or shape of each region changes depending on the applied standard, as can be seen. FIG. 3A shows a region obtained by a specular gloss measuring method for which the angle $\theta$ of incidence and the angle $\theta'$ of receiving are set to 60° or 45°. FIG. 3B shows a region obtained by a specular gloss measuring method for which the angles are set to 20°. These are defined by international standards for a specular gloss such as ISO2813, ISO7668, and ASTM-D523 and the domestic standard JIS-Z8741. FIG. 3C shows a region obtained by a 75° specular gloss measuring method complying with JIS-Z8741. FIG. 3D shows a region obtained by measuring a DOI (Distinct Of Image) when the angle $\theta$ of incidence and the angle $\theta'$ of receiving complying with ASTM-D5767 are 20°.

The control device 101 controls the light amount of the light source 1 and the light receiving time of the light receiving device 100 as an imaging operation. The control device 101 saves the first image data obtained by the imaging device 60 in the memory 102 not directly as raw data but after its data amount is reduced. In this embodiment, the accumulation device 103 obtains, as a representative value, the accumulated value of the pixel values of pixels for each of pixel blocks formed from N adjacent pixel groups. The accumulated value is then saved in the memory 102 as the pixel value of one pixel. Accordingly, second image data is generated by reducing the data amount of the first image data that is raw data at a predetermined reduction rate of 1/N. This is equivalent to generating a 1/N reduced image. Note that instead of accumulating the pixel values of pixels in each pixel block, the pixel value of a pixel at a predetermined position of each pixel block may be obtained as the representative value of the pixel block. Alternatively, the mean value of the pixel values of pixels in each pixel block may be obtained as the representative value of the pixel block. The present invention is not limited to a specific data reduction method, and any other data reduction method may be used.

The calculation device 104 performs calculation processing for the generated second image data and obtains an optical characteristic such as the specular gloss of the surface.

Figure 5:
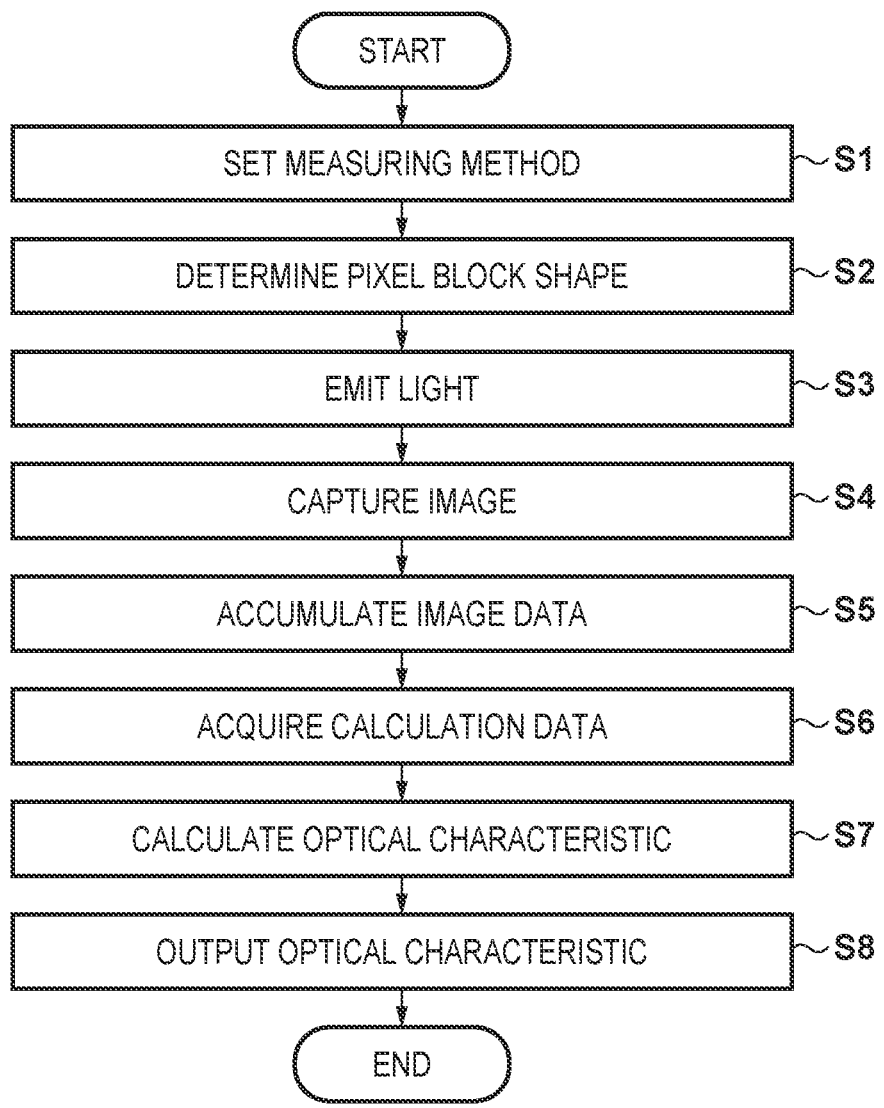
FIG. 5 is a flowchart showing the operation of the measuring apparatus according to the embodiment.

The operation of the measuring apparatus according to this embodiment will be described next with reference to the flowchart of FIG. 5. First, before starting measurement, a measuring method is set (step S1). Here, the user can designate, via the operation device 150, whether to perform single angle measurement or multi-angle measurement. The user can also designate the angle $\theta$ of incidence/angle $\theta'$ of receiving in each measurement. Alternatively, the user may designate to do measurement complying with a plurality of standards. The operation settings of the illumination device 50 and the imaging device 60 are thus defined.

When the setting is completed, the control device 101 determines a pixel block shape (for example, 1×8, 2×16, or 4×4) for data reduction for each measuring method set in step S1 (step S2). The reduction rate of image data is determined by the pixel block shape. Here, for example, a table 105 that describes the correspondence relationship between an available operation setting and a pixel block shape is stored in the memory 102, and a pixel block shape is determined by looking up the table 105. The pixel block shape can be determined based on, for example, the relationship between the pixel pitch of the pixel array 201 and the shape of the region A1. The reduction rate of image data is thus determined in accordance with the operation settings of the illumination device 50 and the imaging device 60.

After the illumination device 50 and the imaging device 60 are operated to the angle θ of incidence/angle θ' of receiving according to the set measuring method, the control device 101 causes the light source 1 to perform a light emitting operation (step S3) and causes the light receiving device 100 to perform an imaging operation (step S4). Next, the accumulation device 103 accumulates the pixel values of each pixel block determined by the set pixel block shape, and stores the accumulated value in the memory 102 as the representative value of the pixel block (step S5). The first image data is thus reduced at the reduction rate determined by the pixel block shape, and second image data is generated.

Next, from the second image data, the calculation device 104 acquires data necessary for optical characteristic calculation, more specifically, the light amount information of a portion corresponding to the region A1 (step S6). For pixels located on the boundary of the region A1, light amount information may be acquired by performing interpolation processing such as linear interpolation of the light amount information.

Next, the calculation device 104 executes calculation processing defined by, for example, JIS-Z8741 based on the light amount information, thereby acquiring a specular gloss as one of optical characteristics (step S7). Note that the calculation processing employed to calculate the optical characteristic is not limited to a method defined by the above-described international standard or domestic standard, and a nonstandard method may be used. As a nonstandard calculation method, there is, for example, a method of acquiring the deflection reflected light distribution characteristic of the surface 10 by measurement, obtaining the full width at half maximum of the deflection reflected light distribution characteristic as specular reflection neighborhood light intensity together with a specular reflected light intensity, and calculating the optical characteristic based on these values. There also exists a method of irradiating the surface 10 with light at a certain angle of incidence, acquiring the angular distribution function of a scattered light intensity by measurement, and calculating the optical characteristic based on a differential value concerning the scattering angle of the angular distribution function.

Next, the control device 101 outputs the information of the optical characteristic obtained in step S5 (step S8). At this time, the control device 101 can, for example, transmit the information of the optical characteristic to a display device (not shown) and cause it to display the information of the optical characteristic. Alternatively, the control device 101 may transmit the information of the optical characteristic to the outside via a network or continuously record it in the memory 102.

Note that the procedure of the steps is not limited to this. For example, a step of measuring and recording background noise may be added. This step can be executed at any timing before the optical characteristic calculation in step S7. In addition, a step of premeasuring the optical characteristic and determining a light amount and irradiation time more appropriate for the final measurement in steps S3 and S4 may be inserted before step S3.

Steps S1 and S2 will be described in more detail. For example, to more correctly grasp the optical characteristic, the user can set to do a plurality of measurements at different angles θ of incidence/angles θ' of receiving in step S1. Alternatively, the user can set measuring methods of different standards using the same angle θ of incidence/angle θ' of receiving. In these cases, the reduction rate may be set for each measuring method based on the table as described above. Alternatively, the reduction rates may be unified according to the method of the strictest condition out of the measuring methods. For example, for a measuring method in which the region A1 used for calculation is small out of the measuring methods, a reduction rate may be set by looking up the table, and the reduction rate may be set for the remaining measuring methods as well. For example, assume that a measuring method that sets the angle θ of incidence/angle θ' of receiving to 60° and a measuring method that sets the angle θ of incidence/angle θ' of receiving to 20° (corresponding to FIGS. 3A and 3B, respectively) are set. Since the region A1 is small in FIG. 3B, the same reduction rate as in the measurement at 20° is used in the measurement at 60° as well.

Figure 6A:
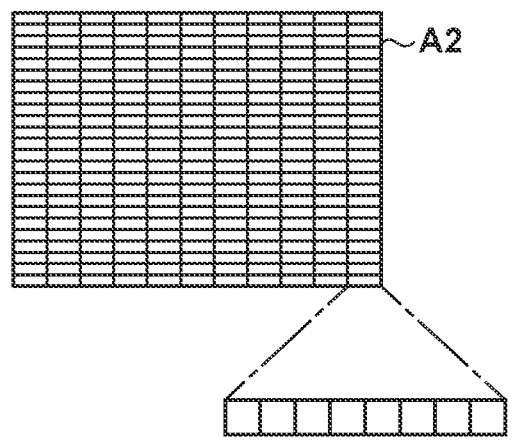
FIGS. 6A to 6C are views for explaining examples of a pixel block shape concerning data reduction.

The case in which measuring methods of different standards using the same angle θ of incidence/angle θ' of receiving are set is, for example, a case in which specular gloss measurement at 20° shown in FIG. 3B and DOI measurement at 20° shown in FIG. 3D are performed. In this case, the region A1 is small in FIG. 3D. The region A1 is long in the lateral direction in both cases. Hence, in step S2, the pixel block shape is determined to a pixel block including 1×8=8 pixels (reduction rate=⅛), as shown in FIG. 6A.

Figure 7:
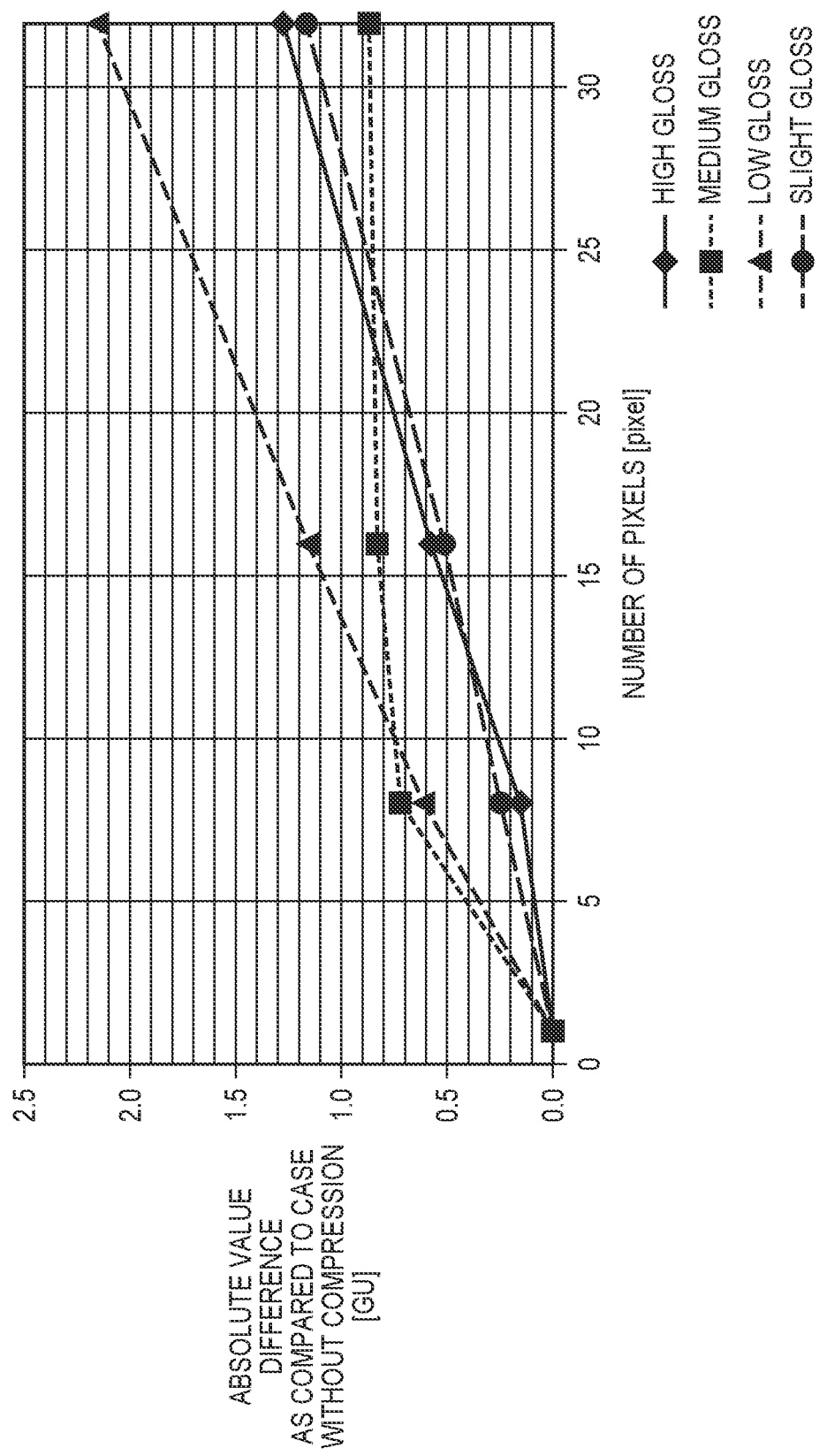
FIG. 7 is a graph showing an example of the relationship between a measurement accuracy and the number of pixels of a pixel block.

FIG. 7 is a graph that compares, by simulations, the specular gloss in a case in which the number of pixels is not reduced and that in a case in which the number of pixels is reduced. This graph plots the following cases for surfaces having different specular glosses, that is, surfaces having different degrees of scattering. Note that "number of pixels" is the number of pixels in one pixel block. The reciprocal of the number of pixels is the reduction rate.

(1) A case in which image data is not reduced (number of pixels=1).

(2) A case in which the number of pixels is reduced by accumulating 1×8 pixels (number of pixels=8).

(3) A case in which the number of pixels is reduced by accumulating 1×16 pixels (number of pixels=16).

(4) A case in which the number of pixels is reduced by accumulating 1×32 pixels (number of pixels=32).

As is apparent from the graph, the higher the reduction rate of the number of pixels is, the larger the measurement error is.

Figure 8:
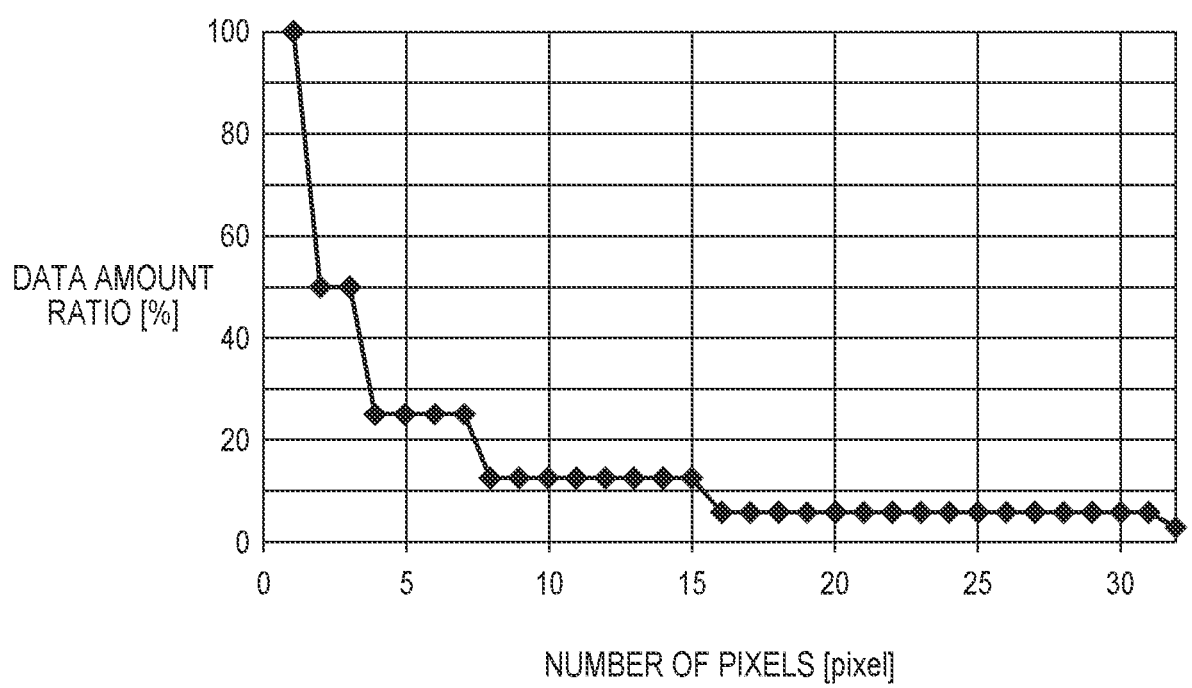
FIG. 8 is a graph showing an example of the relationship between the number of pixels of a pixel block and the amount of image data after data reduction.

FIG. 8 is a graph showing the relationship between the number of pixels of one pixel block and the amount of image data after reduction of the number of pixels. The abscissa represents the number of pixels of one pixel block, and the ordinate represents the ratio (%) of a data amount to a data amount without pixel reduction (the number of pixels=1). When the number of pixels is 8, the reduction rate is ⅛, that is, the data amount (memory utilization) is ⅛. The larger the number of pixels is, the smaller the data amount is. The memory utilization reduction efficiently is maximized when the number of pixels is a power of 2. Since the memory utilization can be reduced, for example, an external memory may be removable, and the internal memory of a microcomputer may suffice. This makes it possible to reduce the substrate volume and cost and attain an advantage particularly for an inexpensive portable measuring apparatus of a small device size.

As is apparent from FIGS. 7 and 8, the larger the number of pixels of one pixel block is, the more the memory utilization is reduced, and the lower the measurement accuracy is, that is, a tradeoff relationship exists. Hence, the maximum number of pixels is selected within the allowable range of accuracy. According to FIG. 7, when the number of pixels of 8 is selected, the difference is smaller than 1.0 GU for all gloss samples as compared to the number of pixels of 1. Since many generally commercially available gloss meters have an instrumental error of 1.0 GU or less, the number of pixels of 8 ensures a sufficient accuracy. Alternatively, correction may be done using an approximation or the like to obtain the same value as that for the number of pixels of 1.

Figure 6B:
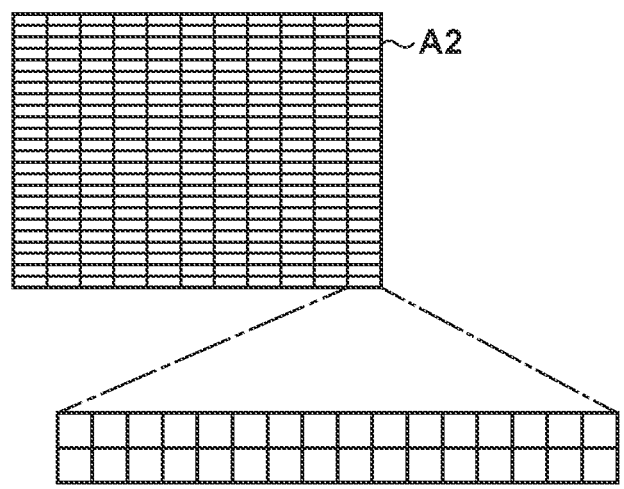
Figure 6C:
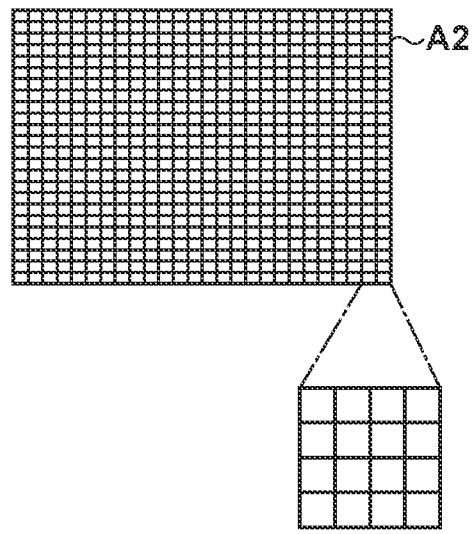

As described above, the reduction rate of the number of pixels is determined in advance by simulations or the like and, for example, the above-described table is created. The pixel block shape corresponds to the shape of the region on the imaging element where reflected light is received. For example, examine a case in which an area sensor having the same size as in FIG. 6A and including twice as many pixels in the vertical and horizontal directions is employed. At this time, the accuracy obtained when the number of pixels is reduced by the pixel block shape of 2×16 pixels shown in FIG. 6B is the same as the accuracy obtained when the number of pixels is reduced by the pixel block shape of 1×8 pixels shown in FIG. 6A. Hence, the reducing method is determined depending on the relationship to the pixel pitch of the employed area sensor as well. Also examine a case in which the 75° specular gloss measuring method is employed. In this case, the region A1 is circular, as shown in FIG. 3C. Hence, the number of pixels may be reduced by employing the pixel block shape of 4×4 pixels as shown FIG. 6C so that the shape is approximated to the circle as much as possible. To comply with a plurality of standards or measure a plurality of angles, reducing methods are preferably unified from the viewpoint of processing efficiency. However, the reducing method may be changed as needed.

Figure 4:
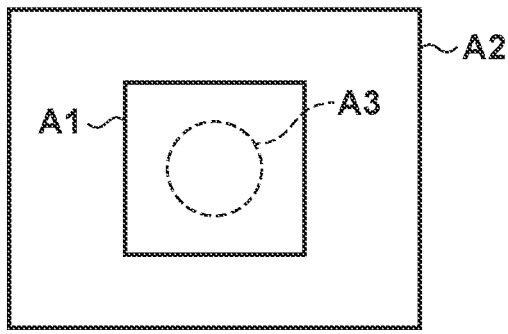
FIG. 4 is a view showing an example of the relationship between the region A2 of the light receiving surface, the region A1 of the light receiving system aperture angle, and the region A3 of the light projecting system aperture angle based on a unique standard.

In addition to or in place of the above embodiment, the following modification can also be considered. In the above embodiment, the arrangement complies with an international or domestic standard. However, a unique method that does not comply with the standards, for example, a case in which the light source slit 31 shown in FIG. 1 is uniquely defined can also be considered. As can be seen from the regions A3 shown in FIGS. 3A to 3D, the light projecting system aperture angle is defined by a rectangle in a general international or domestic standard. Hence, a rectangular light source slit can be used. However, a light source slit having a circular shape or the like or a unique region A1 may be used without complying with the standards, as shown in FIG. 4.

The embodiment of the present invention has been described above. Various changes and modifications can be made within the spirit and scope of the present invention. For example, the accumulation device may be implemented by an FPGA (Field Programmable Gate Array), and the calculation device may be implemented by an MCU (Micro Controller Unit). Alternatively, both accumulation and calculation may be performed by an MCU or an ISP (Image Signal Processor). Before the pixel values are accumulated and converted into one pixel, the values may be weighted and then accumulated in a plurality of pixels. A plurality of pixels on the boundary may overlap each other.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-145249, filed Jul. 22, 2015, which is hereby incorporated by reference herein in its entirety.

What is claimed is:

1. A measuring apparatus for measuring an optical characteristic of a surface, the apparatus comprising:
an illumination device configured to illuminate the surface with light from a light source;
an imaging element configured to include a plurality of pixels arrayed in a matrix and to capture an image of the surface illuminated by the illumination device; and
a processor configured to:
process first image data of the image obtained by the imaging element to obtain the optical characteristic, and set a measuring method defining an operation setting of the illumination device and the imaging element among different measuring methods;
determine a pixel block shape defined by N×M pixels, where N and M are integers, based on the set measuring method,
wherein different pixel block shapes are determined corresponding to the different measuring methods, and
wherein pixels of the first image data are divided by the determined pixel block shape into respective pixel blocks;
obtain respective representative values in the respective pixel blocks using pixel values of the first image data in the respective pixel blocks to obtain second image data including each of the respective representative values as one pixel value of the second image data; and
generate the optical characteristic based on the obtained second image data.

2. The apparatus according to claim 1, wherein the representative value is an accumulated value of pixel values in each pixel block.

3. The apparatus according to claim 1, wherein the representative value is a mean value of pixel values in the pixel block.

4. The apparatus according to claim 1, wherein the processor provides:
a first mode for obtaining the representative value from a first pixel block including 8 pixels arrayed in one direction; and
a second mode for obtaining the representative value from a second pixel block including 16 pixels arrayed in one direction.

5. The apparatus according to claim 1, wherein the processor includes a memory storing a correspondence relationship between the measuring method and the pixel block shape.

6. The apparatus according to claim 1, wherein the set measuring method includes a setting of an angle of incidence of the light with which the illumination device illuminates the surface and an angle of receiving of the reflected light received by the imaging element.

7. The apparatus according to claim 6, wherein the angle of incidence and the angle of receiving are one of 20°, 45°, 60°, 75°, or 85°.

8. The apparatus according to claim 5, wherein the memory stores a table describing the correspondence relationship.

9. The apparatus according to claim 5, wherein, in the memory, the determined pixel block shape is based on a relationship between a pixel pitch of the imaging element and a shape of a region of the imaging element corresponding to an angle of aperture of the imaging element in the set measuring method.

10. The apparatus according to claim 1, wherein the optical characteristic corresponding to the set measuring method includes specular gloss, distinct of image, or haze.

11. The apparatus according to claim 1, wherein the pixel block shape is defined in accordance with an angle of aperture of the imaging element corresponding to the set measuring method.

12. The apparatus according to claim 11, wherein whether N is equal to M is determined in accordance with the angle of aperture of the imaging element.

* * * * *